United States Patent
Verma

(10) Patent No.: US 10,698,387 B2
(45) Date of Patent: Jun. 30, 2020

(54) SYSTEM AND METHOD FOR CONTROL AND/OR ANALYTICS OF AN INDUSTRIAL PROCESS

(71) Applicant: SIEMENS AKTIENGESELLSCHAFT, München (DE)

(72) Inventor: Amit Verma, Berlin (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 164 days.

(21) Appl. No.: 15/172,340

(22) Filed: Jun. 3, 2016

(65) Prior Publication Data
US 2016/0357175 A1 Dec. 8, 2016

(30) Foreign Application Priority Data

Jun. 3, 2015 (EP) .................................... 15170457

(51) Int. Cl.
*G05B 19/418* (2006.01)
*G06F 9/50* (2006.01)
(Continued)

(52) U.S. Cl.
CPC ........... *G05B 19/418* (2013.01); *G05B 19/05* (2013.01); *G06F 9/5072* (2013.01); *H04L 12/00* (2013.01);
(Continued)

(58) Field of Classification Search
CPC ................ G05B 19/418; G05B 19/05; G05B 2219/39266; H04L 12/6418; H04L 12/00; G06F 9/5072
See application file for complete search history.

(56) References Cited

U.S. PATENT DOCUMENTS

2010/0280634 A1* 11/2010 Murashige ........ H04L 12/40176
700/82
2014/0214392 A1* 7/2014 Miller ................. G06F 17/5009
703/13
2017/0098022 A1* 4/2017 Kephart ............. G06F 17/5009

FOREIGN PATENT DOCUMENTS

CN 102968320 A 3/2013
CN 103217907 A 7/2013
(Continued)

OTHER PUBLICATIONS

Machine translation of JP2015-056766.*

*Primary Examiner* — Nathan L Laughlin
(74) *Attorney, Agent, or Firm* — Henry M. Feiereisen LLC

(57) ABSTRACT

A system for control and/or analytics of an industrial process, includes at least one plant-side automation unit, and at least one external processing unit. The automation unit receives process input variables, determines results of a first process control algorithm based on the process input variables within a defined period of time and sends the process input variables to the processing unit. The processing unit executes a second process control algorithm on the basis of the process input variables and the local automation unit receives the results of the second process control algorithm. The plant-side automation unit checks whether the results of the second process control algorithm were received within a time less than or equal to the defined time period. The plant-side automation unit applies the results of the second process control algorithm to the process, when the results were received within a time less than or equal to the defined time period.

6 Claims, 2 Drawing Sheets

(51) Int. Cl.
    *H04L 12/00*       (2006.01)
    *G05B 19/05*       (2006.01)
    *H04L 12/64*       (2006.01)
(52) U.S. Cl.
    CPC ............... *H04L 12/6418* (2013.01); *G05B 2219/39266* (2013.01)

(56) References Cited

FOREIGN PATENT DOCUMENTS

| | | | |
|---|---|---|---|
| EP | 2605096 | A1 | 6/2013 |
| JP | 2009098919 | A | 5/2009 |
| JP | 2015056766 | A | 3/2015 |

\* cited by examiner

SYSTEM AND METHOD FOR CONTROL AND/OR ANALYTICS OF AN INDUSTRIAL PROCESS

CROSS-REFERENCES TO RELATED APPLICATIONS

This application claims the priority of European Patent Application, Serial No. EP15170457, filed Jun. 3, 2015, pursuant to 35 U.S.C. 119(a)-(d), the content of which is incorporated herein by reference in its entirety as if fully set forth herein.

BACKGROUND OF THE INVENTION

The present invention relates to a system and a method for control and/or analytics of an industrial process.

The following discussion of related art is provided to assist the reader in understanding the advantages of the invention, and is not to be construed as an admission that this related art is prior art to this invention.

A plurality of plants that undertake process control generally fulfill simple automation and closed-loop control tasks. These tasks are generally performed by automation units that are installed on site and thus in the vicinity of the process to be automated. Often such plants then also consist of a plurality of mostly also spatially-separated, smaller automation units, which then results in the individual process tasks also running in a distributed fashion. Such smaller automation units, because of their restricted processing power, are not likely to be capable of emulating complex closed-loop control structures and/or simulation strategies, as are possible in higher classes of automation device. Such more complex closed-loop control strategies, which can require a significant processing capacity, can for example be so-called model predictive controls (Model Predictive Control, MPC), as are preferably used in process engineering processes. Frequently there is also the desire to set up complex closed-loop controls which are based on comprehensive historical data and to use these for example in so-called Support Vector Machines (SVM), in order to be able to undertake optimizations to the process on this basis. Therefore such processing-intensive process engineering processes or data analytics models are frequently automated in the superordinate control and monitoring system of the plant.

We are currently experiencing a trend in the direction of central data analytics in external processing units (so-called cloud based analytics). Because of its comprehensive analytics methods and the mostly self-learning techniques, cloud-based analytics allows a significant enhancement of the process controls. However the cloud-processing approaches are often not real-time-capable, because the data must be transferred from sensors or actuators of the industrial process from the plant into the external processing unit, in order to analyze it there. Thereafter the analytics result is to be returned for further actions in order for it to become effective for the processes in the plant, which overall means unacceptable time losses. Closed control circuits—especially when, because of the closed-loop control speed, comparatively fast sampling rates become necessary—are problematic with cloud-based methods on account of the insecure but at least less deterministic communication. The major sources of such time losses lie a) in the data acquisition, the pre-processing and the compression, b) in the transmission of data into the cloud and c) in the analytics and result computation itself. To ameliorate the problem of latency times in cloud-based systems, attempts are being made to make data collection possible by suitable faster hardware. Furthermore it is proposed that the data undergoes processing in order then for only a reduced amount of data to be transmitted into the cloud-based system. A further point in the approach relates to the transmission of the data, in that attempts are being made to provide faster transmission channels with corresponding bandwidths. As part of the analytics itself the cloud-based systems are equipped with high-end computers on which efficient algorithms are then to run.

It has been shown that high bandwidths and low wait times alone are often not sufficient. This is especially true when critical industrial processes are involved.

The object of the invention is thus to specify an alternate facility and an alternate method that support cloud-based process control and/or analytics in the industrial environment deterministically in real time.

SUMMARY OF THE INVENTION

According to one aspect of the present invention a system for control and/or analytics of an industrial process performed by a plant, said system includes a monitoring system configured for control and/or monitoring of the process; at least one automation unit situated on a side of the plant and connected with the monitoring system via a first data connection; and at least one processing unit external to the plant and connected with the at least one automation unit via distributed communication mechanisms and in data communication with the at least one automation via a second data connection, wherein the at least one automation unit determines within a defined time period results of a first process control algorithm based on process input variables read in at a time $t=0$ by an input element of the at least one automation unit, sends the process input variables with a send element of the at least one automation unit to a processing system of the at least one processing unit via the second data connection for processing, wherein the at least one processing unit executing a second process control algorithm with the processing system on the basis of the process input variables, receives with a receive element of the at least one automation unit results of the second process control algorithm, checks with a checking element of the at least one automation unit whether the results of the second process control algorithm were received by the at least one automation unit within a time less than or equal to the defined time period, and applies with an output element of the at least one automation unit the results of the second process control algorithm to the process when the results were received within the time less than or equal to the defined time period.

Accordingly the system for controlling a process has at least one automation unit on the plant side. The industrial plant can be any plant with a production or manufacturing process in the industrial environment. Plant-side means that the automation unit is a component of the original automation system and as a rule is arranged close to the process. The automation unit carries out a number of first process variable computations. To this end the automation unit is linked into the process by means of sensors and actuators. Process input variables are the sensors and actuators, which, for the control of the process, are cyclically read in and buffered by the input module of the automation unit and are thus available for further processing by software by the processors of the automation components. The actual software processing within the automation unit is carried out in accordance with a process control algorithm. The output variables of this processing, i.e. the results of the process control algorithm of the plant-side automation unit as a rule likewise become cyclically effective for the process via an output module of the automation unit. The time tfreq describes the period of time between the time (t=0) at which the process input variables are present in the input module, i.e. the processor of the automation unit can access the data, and the time at which the results of a process control algorithm are present in the output element and thus can become effective for the process via the output modules. The process variables (process input variables) and the results or significant variables of the process control algorithm are made available to a higher-ranking control and monitoring system, in that the automation unit is connected by a first data connection to this superordinate monitoring system for control and/or monitoring of the process.

The system further has a processing unit external to the plant, which is connected via distributed communication mechanisms to the at least one automation unit, i.e. can exchange messages with this unit. A processing unit is to be seen as external to the plant if it is located spatially and/or functionally outside the original automation system. Such processing units external to the plant can be located for example at external service providers and are also referred to as cloud processing units. The data is exchanged via a second data connection. The distributed communication mechanisms include the communication standards OPC (OPC DA, OPC UA) or TCP/IP (Profinet) for example, which allow independent processing units to be interconnected into a distributed system.

The processing unit external to the plant executes a second process control algorithm in parallel to the processing of the first process control algorithm of the plant-side automation unit. Advantageously this second process control algorithm can be significantly more complex and can demand significantly greater processing power compared to the processing power within the local automation unit. The more complex second process control algorithms in such cases are generally based on a larger amount of data, which includes the process input variables for the calculation of the process control algorithms in the plant-side automation unit, but also include additional data. Where this data can be provided by the process itself (for example by additional and as yet unused sensors or actuators), said data is likewise read in and provided via the input element of the plant-side automation unit. Such data can however also include historical data, as is present for example within the plant-side automation unit, the monitoring system or the processing unit external to the plant itself. The computations that are carried out in the processing unit external to the plant are far more complex and processor-intensive than those that can be carried out in the plant-side automation unit. Thus the external processing unit takes on expanded process engineering functions, as are known from MPC controls for example. Furthermore Condition Monitoring Systems, simulation systems or history systems within this processing unit can also carry out additional evaluations and for these purposes will also refer back to signals processed by the closed-loop controls. Because of the greater volume of data, especially historical data, the process control algorithms can for example also include so-called Support Vector Machines (SVM)-based Model Predictive Control (MPC) algorithms.

Because of the requirement for real time processing that is often necessary, i.e. the fast, but especially deterministically repeated sequence of events, especially adherence to a predetermined sampling time, the results sent by the processing unit external to the plant and received by the plant-side automation unit from the processing of the second process control algorithm are checked as to whether they have been received by the plant-side automation unit within the predetermined sampling time $t_{freq}$. The checking is taken over by a checking element within the software of the plant-side automation unit.

In the event of the results having been received within the predetermined time, they are made available via the output element within the plant-side automation unit to their output modules and thus become effective for the process. However in the event of the time $t_{freq}$ having expired without having a result of computations of the second process variable algorithm available within the plant-side automation unit, the results of the first process variable algorithm running in parallel are switched-in via the output modules so as to be effective for the process. In this way it is also insured that a result is present in real time and any delays in communication do not have a significant influence. A result of the first process control algorithm might not represent the optimum for the process, in any event however it insures a sensible error-free control of the process.

According to another aspect of the present invention, a method for control and/or analytics of an industrial process, wherein a local and plant-side automation unit, within a time $t_{freq}$, executes a first process control algorithm on the basis of a number of process input variables N and wherein an external processing unit executes a second process control algorithm on the basis of a number of process input variables M. The method has the following steps: For t=0, i.e. beginning with t=0, in a first step the process input variables N and M are read by the local automation unit. They are thus made available to the processor of the automation unit for processing. The process input variables N involve data from sensors and/or actuators, which is necessary for computation of a first process control algorithm. The process input variables M involve data from sensors and/or actuators, which is necessary for computation of a second, comparatively more complex process control algorithm. This means that as a rule the process input variables M also include the process input variables N. In a next step the process input variables M are sent by the plant-side automation system to the external processing unit. In parallel thereto, on the basis of the process input variables N, the computations according to the first process control algorithm are executed by the local automation unit and the results provided. Such a process control algorithm can be an iteration step of a simple closed-loop control method, depending on the power of the plant-side automation unit, possibly also already of an MPC-closed-loop control method. When the process input variables M are received in the external processing unit the external processing unit executes a second process control algorithm and determines the results. Such a second process control algorithm is an algorithm related to the first process control algorithm. It is designed to deliver a result comparable to computation in the plant-side automation unit, but as rule more exact, more accurate, more precise, higher-quality result. At least however the computation methods in the second process control algorithm will be more complex and more comprehensive. Comparable in this sense means that the second computations are technologically of equal value or equivalent. For example, where the first process control algorithm comprises a simple closed-loop control circuit, the second process control algorithm could emulate an MPC control.

In a further step the results of this second computation are received in the plant-side automation unit. This can be done by interrogation of the local automation unit, or by active sending of the processing unit external to the plant. Within the plant-side automation unit, in a next step a check is made as to whether the results of the second process control algorithm in the plant-side automation unit are in such good time that that they become effective for the process at the sampling time. To this end the result will have to be available within the sampling time, at a maximum at the time of the sampling time. In the event of the result being available in good time, this result is used, i.e. the result becomes the basis of the process control, the process is controlled on the basis of this result. Where the result contains a value for the activation of a closed-loop setting element the associated setting element would be activated with this value by the automation unit. Otherwise the result of the first process control algorithm is applied to the process control, i.e. the process is controlled on the basis of this result or is controlled directly with this result.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
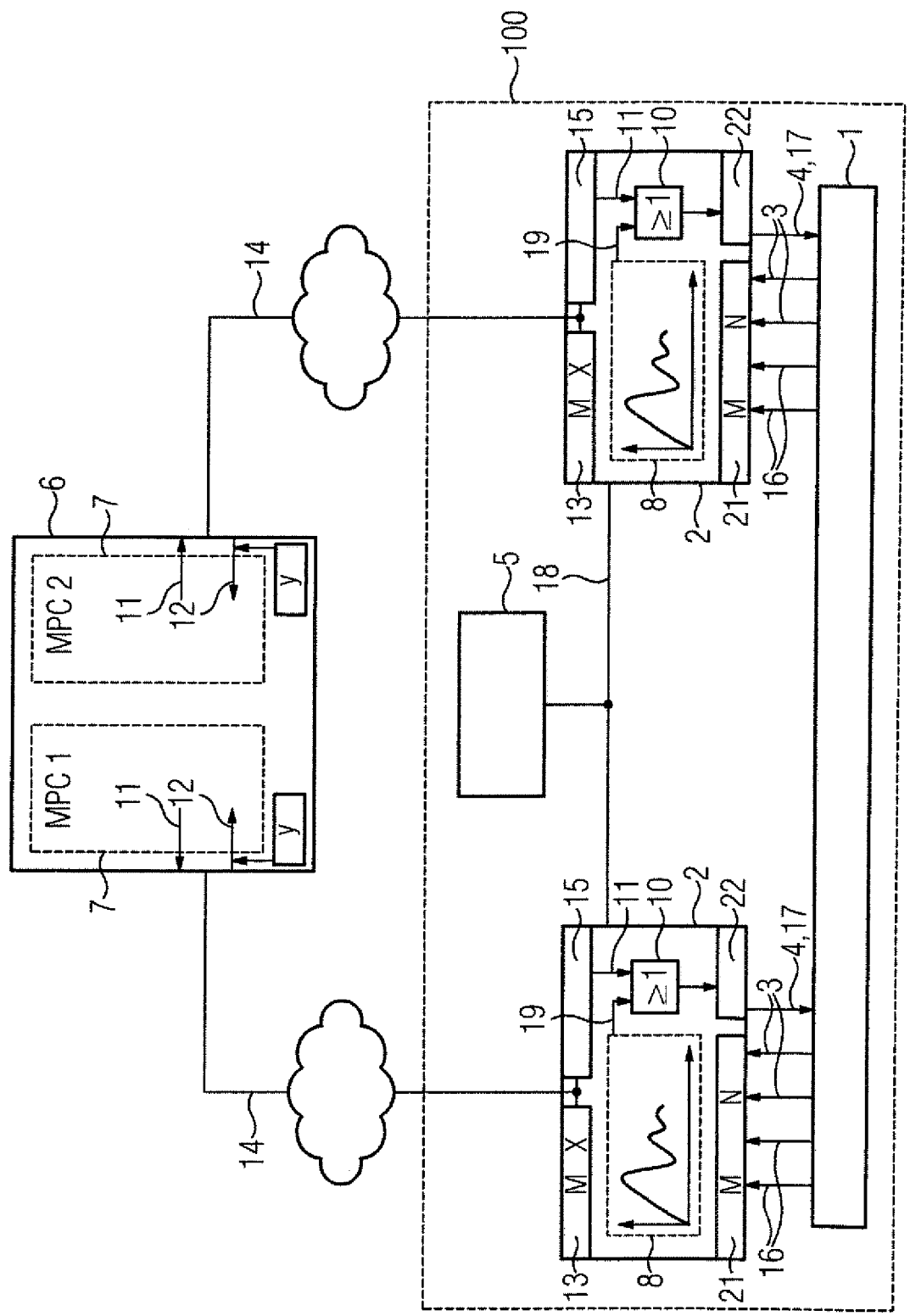
FIG. 1 shows a system for a distributed process control of an industrial plant

Throughout all the Figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

FIG. 1 shows a system 100 for control of the industrial process 1, for example a process for water treatment in a water clarification plant or a process for conveying a liquid, a gas through a pipeline. The industrial process can also be a process which runs within one location, but also across a number of sites. The process 1 is controlled and regulated via decentral, plant-side automation units 2. These are equipped with one or more processors not shown here, which in collaboration with the necessary buffers, process the instructions stored in the software code. The instructions relate to all process control algorithms for control and regulation of the process and also to data communication between the units. The automation units 2, for control and regulation of the process, have a series of effective connections 3, 16 to sensors or actuators not shown in any greater detail in FIG. 1. Via this connection the input element 21 reads in the data, which is then available in a memory area of the automation unit as process input variables N, M. Via the effective connections 4, 17 control commands are realized from output element 22 to actuators of the process not shown in any greater detail in FIG. 1. For example two automation units 2 are shown, in practice a number of automation units will control, regulate and monitor the process. The automation units 2 are connected to the monitoring system 5, which takes over the control and monitoring of the process 1 via a first data connection 20.

On the basis of the process input variables N generated via effective connection 3 the automation units 2 execute control algorithms 8. These are process-effective monitoring analyses and regulations functions, which generally include simpler and less complex analytics regulation tasks. The result 19 of this process control algorithm is retained in the automation unit 2 for further use and, if not needed, is overwritten in a next cycle. In this configuration the system 100 is fully functional and can fulfill its control, regulation and monitoring tasks. Data that has been read in via the effective connections 3, 16 from sensors and actuators of the process from the plant-side automation unit 2 as process input variables M, is transferred to the send element 13. The process input variables M can also contain the process input variables N. In addition historical data X that has been stored over the passage of time in automation unit 2 can also be passed to the send element 13.

The system 100 is expanded by a processing unit external to the plant 6. This is equipped with one or more processors not shown here, which, in collaboration with the necessary buffers, process the instructions held in the software code. The instructions relate to all process control algorithms for control, regulation and analytics of the process as well as to the data communication between the units. The processing unit 6 is connected via a second data connection 14 to the automation units 2. In the present example both automation units 2 are connected via the second data connection 14 to the processing unit external to the plant 6. In other forms of embodiment just one or any given number of automation units 2 can be connected to the processing unit external to the plant 6. The second data connection 14 is realized as either a wired or wireless connection, preferably via the Internet. The processing unit external to the plant 6 executes process control algorithms 7 based on input process variables 12, which are essentially based on the process input variables M and outputs results 11 of these computations. The input process variables 12 can likewise be based on the historical data X, which is present in the automation unit 2. As an alternative or in addition, the input process variables 12 can be based on historical data Y, which is present in the processing unit 6 itself. For example FIG. 1 presents an MPC closed-loop control structure as process control algorithm 7. But more comprehensive data analytics can also be the subject matter of the aforesaid algorithm. The results 11 of the process control algorithm 7 are received by the receive element 15 of the automation component 2. The checking element 10 receives the information about whether the result 11 is available with the cycle time predetermined by the actual closed-loop control task. If it is available it is passed to the output element 22 and becomes effective for the process via the effective connection 17. If it is not available within the time interval, the output element 22 is supplied with the result 19 determined in parallel and effective for the process as effective connection 4.

Figure 2:
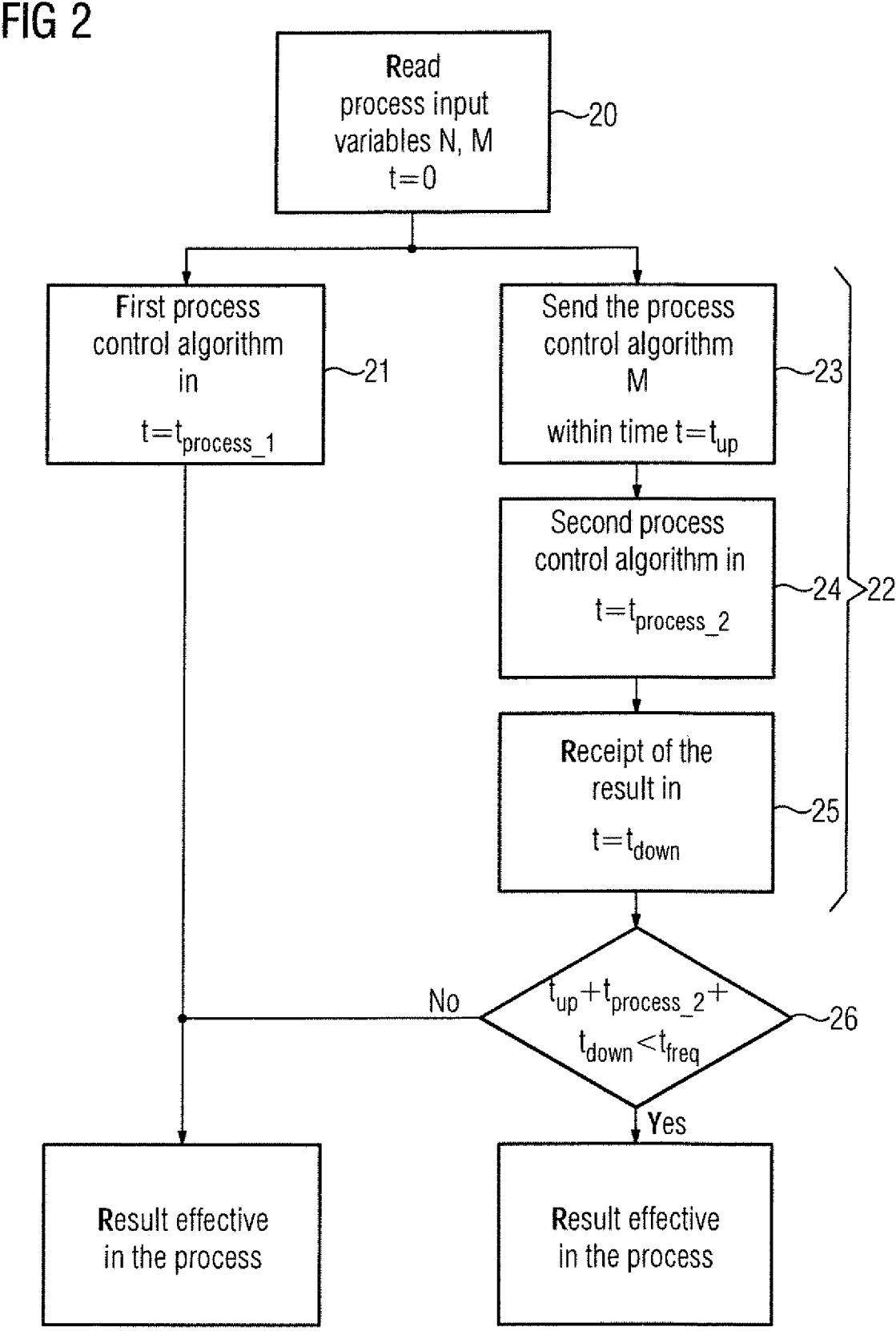
FIG. 2 shows the flow diagram of the described method.

FIG. 2 shows the flow diagram of the described method. The control and regulation of the process 1 occurs cyclically. The cycle time is defined by $t_{freq}$.

Accordingly, in step 20, the process input variables N and M are read. The reading in of process input variables by the automation unit also occurs cyclically. I.e. at the beginning of the cycle time the updated process map is available to the program, in that the input modules 21 of the automation unit 2 have been interrogated. At the end of the cycle time the output modules 22 are supplied with the process results 11, 19, via which said modules control the process. Each new reading by the cyclic program of the automation unit should take place by time t=0. The process input variables N are processed in step 21 by the first process control algorithm in the automation unit 2 within the time $t_{process\_1}$. The result 19 is available at the end of the computation of this process control algorithm. The automation unit 2 is capable of running its process control algorithm within the cycle time $t_{freq}$. The step sequence 22 runs in parallel to step 21. In said sequence, in step 23 the process input variables M are sent to the processing unit 6. The overall step 23 should also include the receipt of the data in the processing unit 6 and should occur within the time $t_{up}$. The process input variables M can also include the process input variables N, they can also comprise only said variables. As a rule however the process input variables will include process data which goes beyond the scope of the data N. On the basis of these process input variables, in step 24, a second process control algorithm is processed within the time $t_{process\_2}$, which delivers results for control of the process, for example activation commands for actuators. These are received in step 25 within the time $t=t_{down}$ from the automation unit 2. In decision block 26 a check is made by the automation unit 2 as to whether the sum of the times $t_{up}$, $t_{process\_2}$ and $t_{down}$ is less than the cycle time $t_{freq}$ and thus the result of the process control algorithm is available within the cycle time. If this is the case these computations become effective for the process, i.e. actuators are activated for example on the basis of setting value computations in the processing unit 6.

Should the results not be available within the cycle time, the computations of automation unit 2 become effective for the process as an alternative.

What is claimed is:

1. A system for control and/or analytics of an industrial process performed by a plant, said system comprising:
    a monitoring system configured for control and/or monitoring of the process;
    at least one automation unit situated on a side of the plant and connected with the monitoring system via a first data connection; and
    at least one processing unit external to the plant and connected with the at least one automation unit via distributed communication mechanisms and in data communication with the at least one automation unit via a second data connection,
    said at least one automation unit
    determining within a defined time period results of a first process control algorithm based on process input variables read in at a time t=0 by an input element of the at least one automation unit,
    sending the process input variables with a send element to a processing system of the at least one processing unit via the second data connection for processing, said at least one processing unit executing a second process control algorithm with the processing system on the basis of the process input variables, said at least one processing unit executing the second process control algorithm in parallel to the determining the results of the first process control algorithm,
    receiving with a receive element of the at least one automation unit results of the second process control algorithm,
    checking with a checking element of the at least one automation unit whether the results of the second process control algorithm were received by the at least one automation unit within a time less than or equal to the defined time period,
    applying with an output element of the at least one automation unit the results of the second process control algorithm to the process when the results were received within the time less than or equal to the defined time period, thereby the controlling the process on the basis of this result and/or controlling the process directly with this result, and
    when the results were not received within the time less than or equal to the defined time period, switching in the results of the first process control algorithm via output modules.

2. The system as claimed in claim 1, wherein the at least one automation unit applies the results of the first process control algorithm to the process, when the results of the second process control algorithm were received within a time greater than the defined time period.

3. The system of claim 1, further comprising further processing units external to the plant, wherein the processing unit external to the plant is connected to the further processing units.

4. A method for control and/or analytics of an industrial process, comprising: reading at a time t=Q with a local automation unit first process input variables and second process input variables;
    sending the second process input variables to an external processing unit;
    determining with the local automation unit at least one result of a first process control algorithm on the basis of the first process input variables within a defined time period;
    determining with the external processing unit at least one result of a second process control algorithm on the basis of the second process input variables in parallel to the determining the at least one result of the first process, control algorithm;
    receiving the at least one result of the second process control algorithm in the local automation unit;
    checking whether the result of the second process control algorithm was received by the local automation unit within a time less than or equal to the defined time period; and
    applying the result of the second process control algorithm to the process, when the result was received within the time less than or equal to the defined time period,
    wherein the result of the first process control algorithm is applied to the process, when the result of the second process control algorithm was received within a time greater than the defined time period.

5. The method of claim 4, wherein the first process input variables and the second process input variables are identical.

6. The method of claim 4, wherein the results of the first and second process control algorithm are additionally determined on the basis of a number of items of historical data.

* * * * *